United States Patent
Hsiao

(10) Patent No.: US 6,883,385 B2
(45) Date of Patent: Apr. 26, 2005

(54) SINGLE-AXIAL PRECISION MEASURING APPARATUS

(75) Inventor: Cheng-Fu Hsiao, Jhongli (TW)

(73) Assignee: Barmu Tech., Ltd., Jhongli (TW)

( * ) Notice: Subject to any disclaimer, the term of this patent is extended or adjusted under 35 U.S.C. 154(b) by 64 days.

(21) Appl. No.: 10/627,675

(22) Filed: Jul. 28, 2003

(65) Prior Publication Data

US 2005/0022607 A1 Feb. 3, 2005

(51) Int. Cl.$^7$ .............................................. G01L 1/24
(52) U.S. Cl. ....................................................... 73/800
(58) Field of Search ....................... 73/800; 324/158.1; 310/90.5; 348/80

(56) References Cited

U.S. PATENT DOCUMENTS 5,191,249 A * 3/1993 Rauscher et al. .......... 310/90.5

6,545,458 B1 * 4/2003 Yamazaki ................ 324/158.1

* cited by examiner

Primary Examiner—Edward Lefkowitz
Assistant Examiner—Octavia Davis

(57) ABSTRACT

A single-axial precision measuring apparatus includes a base, a flatbed at the base, a flattening mechanism and a monitor above the flatbed, and a distance measuring mechanism below the flatbed. The characteristics of the invention are that, the flatbed is a transparent plate having a plurality of ventilation openings that are connected with a suction tube of a vacuum suction device; the flattening mechanism is capable of up-and-down displacements, and has multi-sectional halt heights through program controls; and the distance measuring mechanism disposed below the flatbed is capable of transverse movements, and at least has an optical ruler, a laser positioning element and CCD cameras. Wherein, the CCD cameras focus at the measuring points, and transmit images captured to the monitor.

5 Claims, 5 Drawing Sheets

SINGLE-AXIAL PRECISION MEASURING APPARATUS

BACKGROUND OF THE INVENTION (a) Field of the Invention

The invention relates to a single-axial precision measuring apparatus, and more particularly, to a measuring apparatus for measuring apertures and planar measurements of circuit board films or finished products. Apart from optical lock-point guidance and computerized linear measuring, the single-axial precision measuring apparatus also adopts vacuum suction and a multi-sectional flattening mechanism for fixing without damaging the films or boards, while also overcoming curvatures and warps in the boards. The single-axial precision measuring apparatus additionally has a temperature compensation/adjustment device for avoiding material variations due to temperature changes, and thus minimizing measurement errors.

(b) Description of the Prior Art

Manufacturing process of prior circuit boards includes tasks such as drawing masters, films and production boards, and drilling. Present circuit designs of circuit boards are and becoming smaller and more accurate, and are even divided into various tiers. In addition, subsequent tasks namely drilling and inserting electronic components are completed using high-speed automated equipments. Therefore, precision measuring of various measurements of the films and production boards are certainly quite crucial.

However, when using a prior measuring apparatus for two-dimensional or three-dimensional measurements, surfaces of circuit boards or films to be measured are placed to face upward. A charge coupled device (CCD) camera is disposed above a table for enlarging the circuit boards or films, which are then positioned and measured in coordination with naked eye; artificial visional errors are hence frequently incurred. Furthermore, pictures are taken by the CCD camera in a downward direction, and measurement results are likely affected due to errors in focal lengths caused by different thicknesses of the circuit boards or films. Above all, when disposing a camera above a table, errors of measurement accuracy is further worsened by curvatures and warps in the plates in the lack of flattening mechanisms.

SUMMARY OF THE INVENTION

In the view of the aforesaid drawbacks of measurements of the prior as being prone to errors, the primary object of the invention is to provide a single-axial precision measuring apparatus for linear distances. Wherein, a laser beam positions and labels a first measuring point, and a computer automatically reads data from an optical ruler. Meanwhile, a CCD automatically captures an image and calculates a relative center position between the first measuring point and the optical ruler. During moving and positioning for measuring a position of a second point, the computer also automatically reads data from the optical ruler. The CCD again automatically captures an image and calculates a relative center position between the second measuring point and the optical ruler. A distance or length is obtained by calculating relative positions of the two center points using the computer, so as to obtain an exact measurement.

Another object of the invention is to provide a single-axial precision measuring apparatus, wherein a to-be-measured surface is adhered to a transparent flatbed. Next, CCD cameras capture images by photographing in an upward direction, and hence accuracy of photographic focal lengths and measurements remains unaffected although in the presence of different thicknesses.

Another object of the invention is to provide a single-axial precision apparatus, wherein a multi-sectional flattening mechanism is used for rapidly and readily flattening films or circuit boards, so as to prevent curvatures and warps in the boards to further enhance measuring accuracy.

The other object of the invention is to provide a single-axial precision measuring apparatus having a temperature sensor near a flatbed thereof. Signals of ambient temperatures detected by the temperature sensor are inputted into a computer for algorithm, so as to compensate variations of materials operating under different temperatures for ensuring measuring accuracy.

To accomplish the aforesaid objects, the invention comprises a flatbed as a transparent plate and having a plurality of ventilation openings that are connected with a suction tube of a vacuum suction device; a flattening mechanism capable of up-and-down displacements, and has multi-sectional halt heights through program controls; and a distance measuring mechanism disposed below the flatbed, capable of transverse movements, and at least has an optical ruler, a laser positioning element and CCD cameras, wherein the CCD cameras focus at measuring points, and transmit images captured to the monitor.

In addition, the invention further comprises at least one temperature sensor at a base and near the flatbed. The temperature sensor acquires ambient temperatures of the flatbed, and in coordination with embedded algorithms of temperature compensation programs in a computer, errors occurred by temperature changes during measuring can be automatically adjusted and compensated at all time, thereby obtaining optimal precisions.

DETAILED DESCRIPTION OF THE PREFERRED EMBODIMENTS

Figure 1:
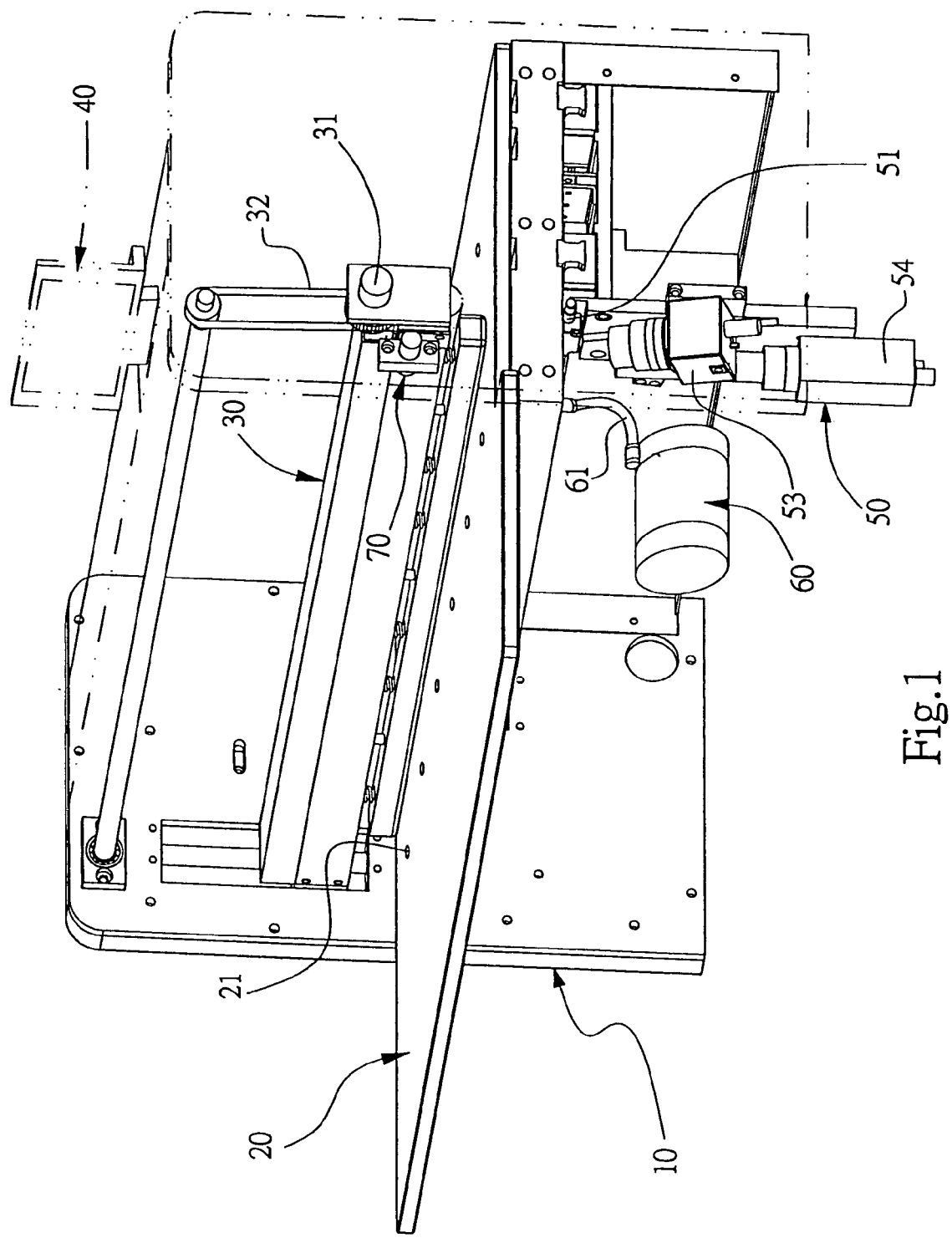
FIG. 1 shows a top elevational view according to the invention.
Figure 2:
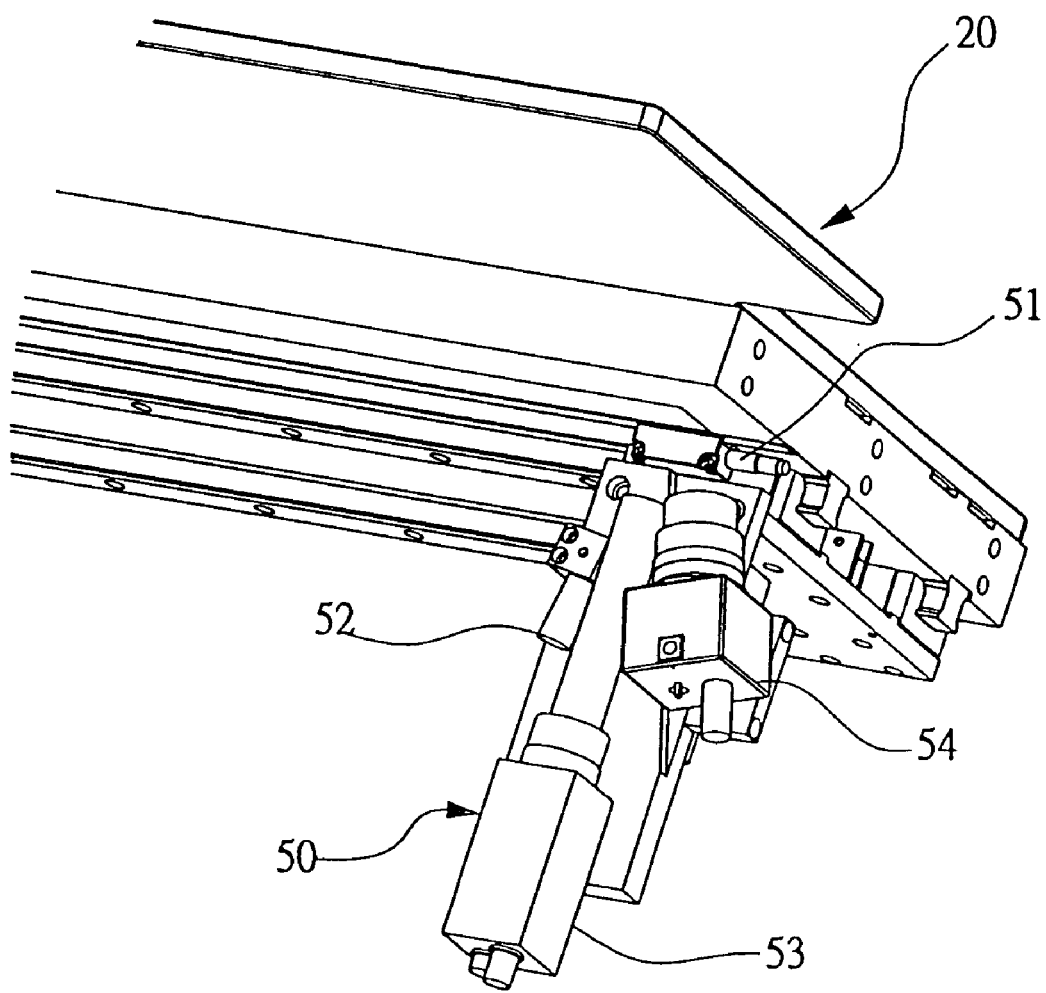
FIG. 2 shows an upward partial elevational view according to the invention.
Figure 3:
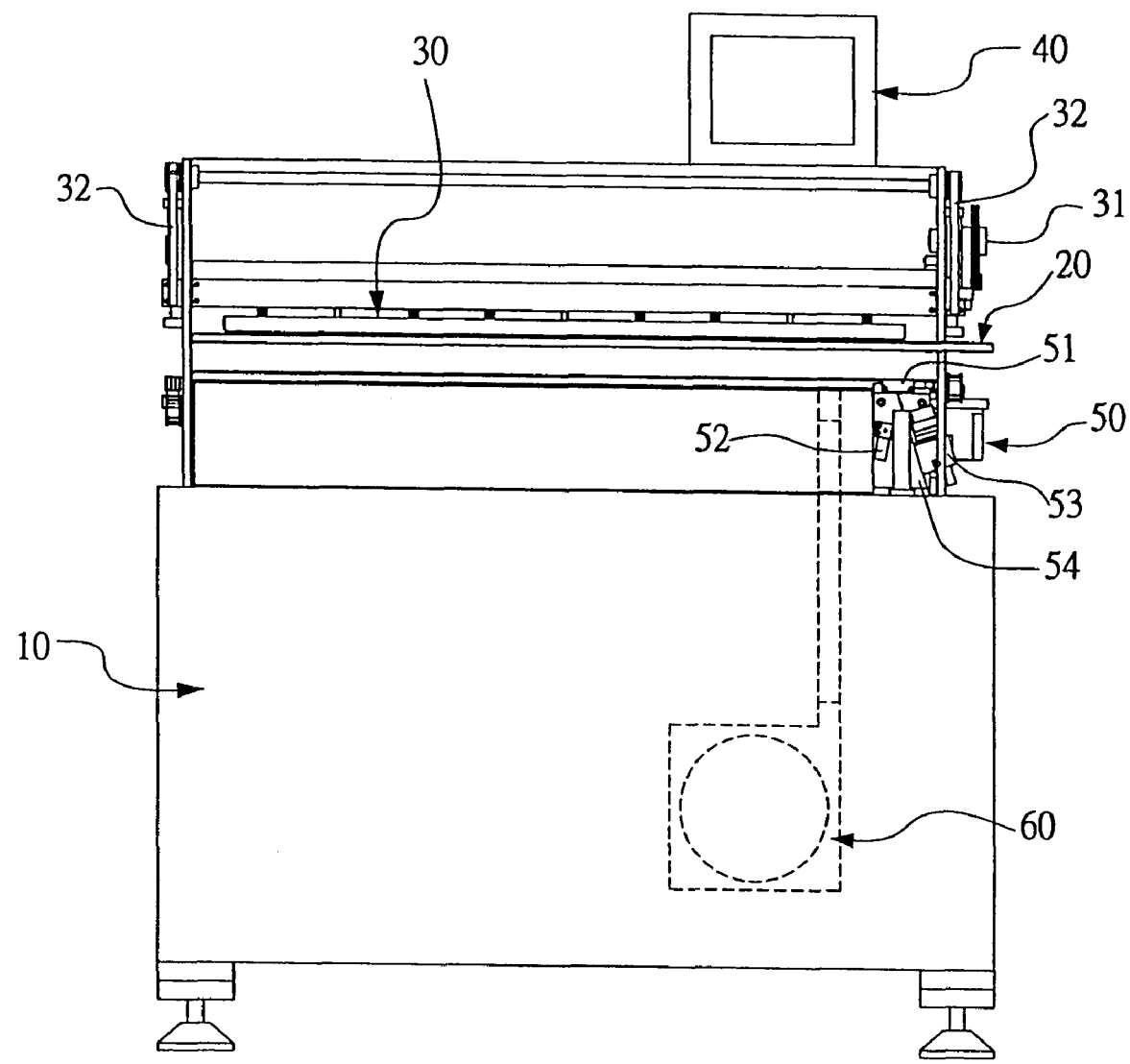
FIG. 3 shows a planar elevational view according to the invention.
Figure 4:
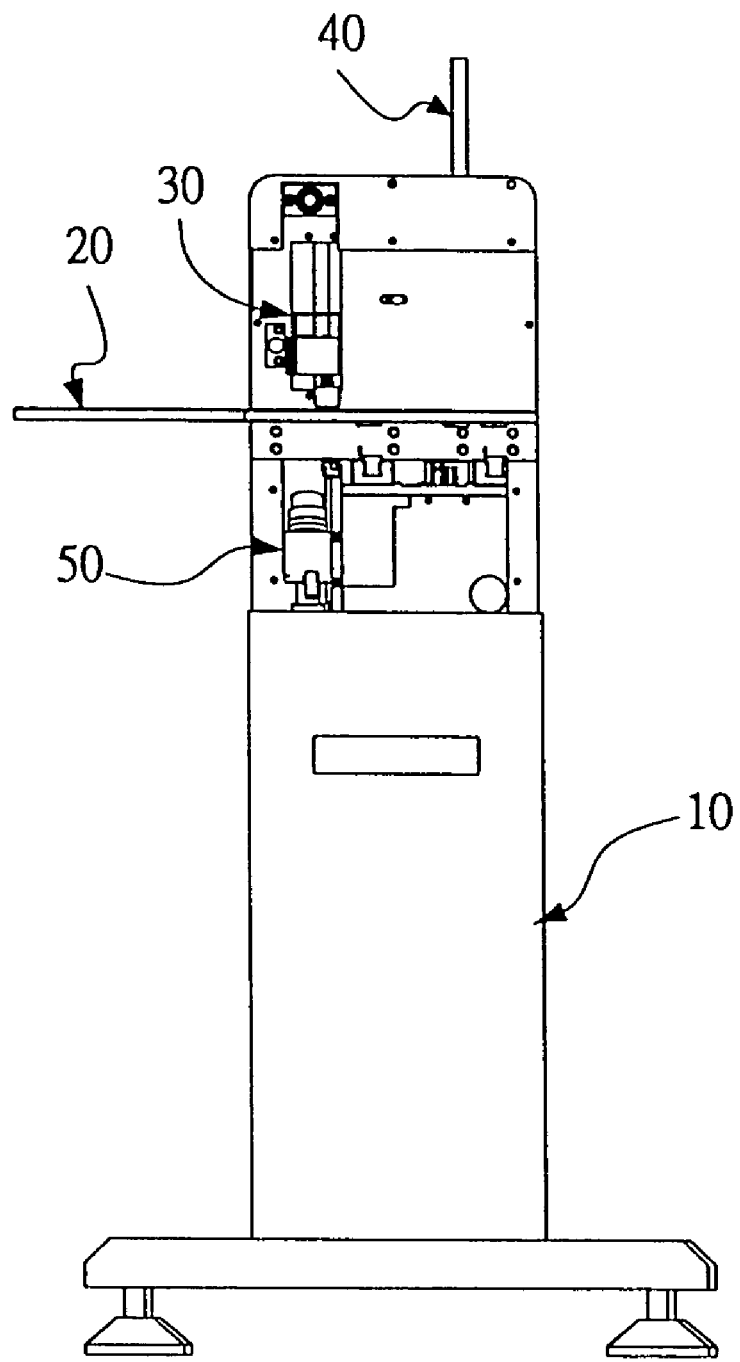
FIG. 4 shows a planar side view according to the invention.

To better understand the structure, devices and characteristics of the invention, detailed descriptions shall be given with the accompanying drawings hereunder.

Referring to FIGS. 1 to 4, a single-axial precision measuring apparatus according to the invention comprises a base 10, a flatbed 20 at the base 10, a flattening mechanism 30 and a monitor 40 above the flatbed 20, and a distance measuring mechanism 50 below the flatbed 20. The characteristics of the invention are that:

the flatbed 20 is a transparent plate having a plurality of ventilation openings 21 that are connected with a suction tube 61 of a vacuum suction device 60; the flattening mechanism 30 is driven for up-and-down displacements by a servo motor 31 and a timing belt 32, and is provided with multi-sectional halt heights through program controls; and the distance measuring mechanism 50 disposed below the flatbed 20 is capable of transverse movements, and at least has an optical ruler 51, a laser positioning element 52, and two CCD cameras 53 and 54, wherein the two CCD cameras 53 and 54 simultaneously focus at a reticle projected by the laser positioning element 52, have different magnifications, and are capable of transmitting images to the monitor 40 for further observations.

When using an assembled structure as described above, a film or a circuit board to be measured is placed on the flatbed 20 with a to-be-measured surface facing downward, and is adhered and fixed at the flatbed 20 using vacuuming effects of the vacuum suction device 60. An appropriate control button is chosen according to a thickness of the film or the circuit board, so as to allow the flattening mechanism 30 to automatically descend to an appropriate height for producing an appropriate pressing force. Consequently, the structure according to the invention does not damage the to-be-measured surface of the film or the circuit board, and ensures that the surface is flatly adhered to the transparent flatbed 20 by preventing curvatures and warps in the film or the circuit board.

Moreover, the single-axial distance measuring mechanism 50 is capable of free transverse movements below the fixed transparent flatbed 20, and a distance moved is calculated using the optical ruler 51 disposed in parallel. Meanwhile, the CCD cameras 53 and 54 automatically capture images of two measuring points. A relative center position of the two measuring points is calculated for obtaining measurements of the two points without resulting in errors caused by deviated center positions of measuring points of a to-be-measured object.

As described above, the CCD cameras 53 and 54 according to the invention capture images of a same measuring point using different magnifications. An image acquired by one CCD camera 53 may be an enlarged image of the to-be-measured region, so as to examine relative positions and shapes of the measuring point with surrounding circuits, and to further confirm whether the measuring point obtained is accurate. The other CCD camera 54 is for magnifying the to-be-measured region to a maximum value for selecting the measuring point, thereby accomplishing most exact point-taking effects. The CCD cameras 53 and 54 according to the invention are kept at certain distances from the flatbed 20. When any to-be-measured object is adhered facing downward at the flatbed 20, distances between the CCD cameras 53 and 54 are maintained unchanged, and therefore the measuring precision remains unaffected although differences in thicknesses of to-be-measured objects such as films or circuit boards are present.

In addition, an appropriate position at the base 10 and near the flatbed 20 is provided with at least one temperature sensor 70. The temperature sensor 70 acquires ambient temperatures of the flatbed 20, and in coordination with embedded algorithms of temperature compensation programs in a computer, errors occurred by temperature changes during measuring can be automatically adjusted and compensated at all time, thereby obtaining optimal precisions.

Figure 5:
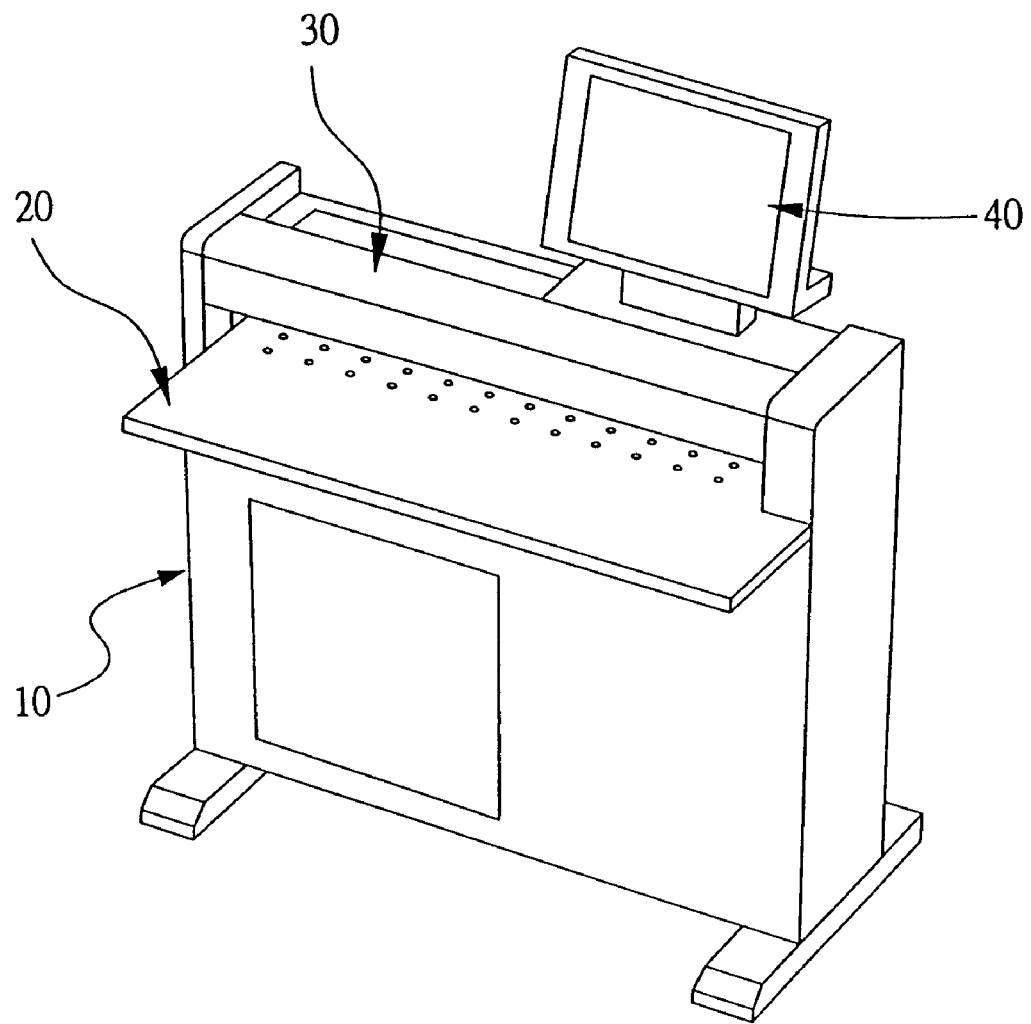
FIG. 5 shows an elevational view illustrating the mechanism being provided with a housing according to the invention.

According to the aforesaid structure, in order to increase esthetic values and preventing mechanical or human damages, an exterior of the base 10 may be appropriately sealed and packaged as shown in FIG. 5.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A single-axial precision measuring apparatus comprising a base, a flatbed at the base, a monitor above the flatbed, and a distance measuring mechanism below the flatbed; and the characteristics being that:

the distance measuring mechanism below the flatbed captures images in an upward direction, and calculates relative center positions of two to-be-measured images captured by charge coupled devices (CCD) using measurements read by an optical ruler disposed in parallel with a single-axial sliding track, thereby obtaining a length between two measuring points;

the flatbed is a transparent plate having a plurality of ventilation openings that are connected with a suction tube of a vacuum suction device; and the distance measuring mechanism disposed below the flatbed is capable of transverse movements, and at least has an optical ruler, a laser positioning element and CCD cameras; wherein the CCD cameras focus at the measuring points, and transmit the images to the monitor.

2. The single-axial precision measuring apparatus in accordance with claim 1, wherein the base has a flattening mechanism above the flatbed, with the flattening mechanism being capable of up-and-down displacements and having multi-sectional halt heights via program controls.

3. The single-axial precision measuring apparatus in accordance with claim 1, wherein two CCD cameras provided have different magnifications, and focus at a same measuring point.

4. The single-axial precision measuring apparatus in accordance with claim 1, further comprising at least one temperature sensor at an appropriate position at the base and near the flatbed, wherein the temperature sensor acquires ambient temperatures of the flatbed, and in coordination of embedded algorithms of temperature compensation programs in a computer, errors occurred by temperature changes during measuring process are automatically adjusted and compensated at all time.

5. The single-axial precision measuring apparatus in accordance with claim 2, further comprising at least one temperature sensor at an appropriate position at the base and near the flatbed, wherein the temperature sensor acquires ambient temperatures of the flatbed, and in coordination of embedded algorithms of temperature compensation programs in a computer, errors occurred by temperature changes during measuring process are automatically adjusted and compensated at all time.

\* \* \* \* \*